(12) United States Patent  
Choi et al.

(10) Patent No.: US 11,380,955 B2  
(45) Date of Patent: Jul. 5, 2022

(54) BATTERY MODULE, AND BATTERY PACK AND VEHICLE COMPRISING THE SAME

(71) Applicant: LG CHEM, LTD., Seoul (KR)

(72) Inventors: Mi-Geum Choi, Daejeon (KR); Jeong-O Mun, Daejeon (KR); Dal-Mo Kang, Daejeon (KR); Yoon-Koo Lee, Daejeon (KR); Jung-Been You, Daejeon (KR); Dong-Yeon Kim, Daejeon (KR); Jin-Hak Kong, Daejong (KR); Yong-Seok Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 886 days.

(21) Appl. No.: 15/738,376

(22) PCT Filed: Apr. 5, 2017

(86) PCT No.: PCT/KR2017/003746  
§ 371 (c)(1),  
(2) Date: Dec. 20, 2017

(87) PCT Pub. No.: WO2017/209388  
PCT Pub. Date: Dec. 7, 2017

(65) Prior Publication Data  
US 2018/0175343 A1 Jun. 21, 2018

(30) Foreign Application Priority Data  
May 31, 2016 (KR) .................. 10-2016-0067766

(51) Int. Cl.  
*H01M 50/20* (2021.01)  
*H01M 10/04* (2006.01)  
(Continued)

(52) U.S. Cl.  
CPC ............. *H01M 50/20* (2021.01); *B60L 50/64* (2019.02); *F16F 1/18* (2013.01); *F16F 15/073* (2013.01);  
(Continued)

(58) Field of Classification Search  
CPC .... B60L 2270/00; B60L 50/50; F16F 15/073; F16F 1/18; H01M 10/0413; H01M 10/0481; H01M 2220/20; H01M 2/1077  
See application file for complete search history.

(56) References Cited

U.S. PATENT DOCUMENTS

2003/0162091 A1* 8/2003 Watanabe ........... H01M 2/0262  
429/156  
2012/0107678 A1* 5/2012 Kim ..................... H01M 10/04  
429/186  
(Continued)

FOREIGN PATENT DOCUMENTS

CN 204348779 U 5/2015  
EP 2 381 506 A1 10/2011  
(Continued)

OTHER PUBLICATIONS

International Search Report for PCT/KR2017/003746 dated Aug. 3, 2017.

*Primary Examiner* — Adam A Arciero  
(74) *Attorney, Agent, or Firm* — Birch, Stewart, Kolasch & Birch, LLP

(57) ABSTRACT

Disclosed is a battery module, which includes a plurality of battery cells disposed to face each other and arranged side by side at least in a first direction, a module cover configured to accommodate the plurality of battery cells and formed to have at least one open side, and a pair of buffering members located between one side of a battery cell located at an outermost side in the first direction among the plurality of battery cells and a side of the module cover so that at least (Continued)

a part thereof is in contact with the sides of the battery cells and the module cover, respectively, wherein the buffering member is a leaf spring having at least one bent portion.

19 Claims, 14 Drawing Sheets

(51) Int. Cl.
  *B60L 50/64* (2019.01)
  *F16F 1/18* (2006.01)
  *F16F 15/073* (2006.01)

(52) U.S. Cl.
  CPC ... *H01M 10/0413* (2013.01); *H01M 10/0481* (2013.01); *B60L 2270/00* (2013.01); *H01M 2220/20* (2013.01)

(56) References Cited

U.S. PATENT DOCUMENTS

| | | | |
|---|---|---|---|
| 2014/0242429 A1 | 8/2014 | Lee et al. | |
| 2015/0079452 A1 | 3/2015 | Park et al. | |
| 2015/0111080 A1 | 4/2015 | Nomura et al. | |
| 2015/0214570 A1* | 7/2015 | Deponte | H01M 2/1653 429/99 |
| 2015/0340669 A1 | 11/2015 | Aoki | |
| 2017/0054119 A1 | 2/2017 | Lee | |

FOREIGN PATENT DOCUMENTS

| | | |
|---|---|---|
| EP | 2 421 069 A1 | 2/2012 |
| JP | 59-101355 U | 7/1984 |
| JP | 2001-511592 A | 8/2001 |
| JP | 2006-318871 A | 11/2006 |
| JP | 4070798 B2 | 4/2008 |
| JP | 2013-73918 A | 4/2013 |
| JP | 2013-101809 A1 | 5/2013 |
| JP | 5339492 B2 | 11/2013 |
| JP | 2015-76188 A | 4/2015 |
| JP | 2015-149238 A | 8/2015 |
| KR | 10-2006-0060800 A | 6/2006 |
| KR | 10-2007-0025735 A | 3/2007 |
| KR | 10-2013-0086677 A | 8/2013 |
| KR | 10-2014-0118075 A | 10/2014 |
| KR | 10-2015-0031861 A | 3/2015 |
| KR | 10-2016-0041815 A | 4/2016 |
| WO | WO 99/05743 A1 | 2/1999 |
| WO | WO 2014/125605 A1 | 8/2014 |
| WO | WO 2014/128841 A1 | 8/2014 |

\* cited by examiner

BATTERY MODULE, AND BATTERY PACK AND VEHICLE COMPRISING THE SAME

TECHNICAL FIELD

The present disclosure relates to a battery module, and a battery pack and a vehicle comprising the same, and more particularly, to a battery module capable of preventing a damage of a battery cell and increasing an energy density of the battery module, and a battery pack and a vehicle comprising the same.

The present application claims priority to Korean Patent Application No. 10-2016-0067766 filed on May 31, 2016 in the Republic of Korea, the disclosures of which are incorporated herein by reference.

BACKGROUND ART

Secondary batteries are highly applicable to a wide range of products and have electrical characteristics with high energy density. Such secondary batteries are applied not only to portable electronic devices but also to electric vehicles, hybrid vehicles, and electric power storage devices, driven by electric driving sources.

A battery pack applied to an electric vehicle and the like is configured so that a plurality of battery modules, each having a plurality of battery cells, are connected to obtain a high output. Each battery cell is an electrode assembly and may be repeatedly charged and discharged by an electrochemical reaction among components including a positive electrode current collector, a negative electrode current collector, a separator, an active material, an electrolyte and the like.

Meanwhile, along with an increased need for a large capacity structure and utilization as energy storage sources in recent years, there is a growing demand for a multi-module battery pack in which a plurality of battery modules, each having a plurality of secondary batteries connected in series or in parallel, are aggregated.

However, when the battery cell of the battery module is repeatedly charged and discharged, a swelling phenomenon occurs at the battery cell. In consideration of the swelling phenomenon, in the existing technique, when battery cells are stacked at a battery module, the battery cells are located at a predetermined interval, or a compression pad for supporting the battery cells in a swelling state is disposed between the battery cells.

However, if the compression pads or the battery cells described above are disposed at intervals, the volume where the battery cells may occupy in the battery module is reduced. If the volume occupied by the battery cells in the battery module is reduced, the energy density of the battery cells is decreased. Also, if the compression pad is used between the battery cells, the manufacturing process of the battery module becomes complicated and the manufacturing cost of the battery module is increased.

In addition, if the battery cells are disposed at regular intervals without using a compression pad, the battery cells may be damaged due to swelling of the battery cell or external impact since the battery cells are not fixed.

DISCLOSURE

Technical Problem

The present disclosure is designed to solve the problems of the related art, and therefore the present disclosure is directed to providing a battery module which may protect a battery cell and increase an energy density of the battery module, and a battery pack and a vehicle comprising the same.

The present disclosure is also directed to providing a battery module which may have a simplified manufacturing process, and a battery pack and a vehicle comprising the same.

The present disclosure is not limited thereto, and other objects not mentioned herein may be clearly understood by those skilled in the art from the following description.

Technical Solution

The present disclosure provides a battery module having a plurality of battery cells.

According to an embodiment of the present disclosure, the battery module comprises: a plurality of battery cells disposed to face each other and arranged side by side at least in a first direction; a module cover configured to accommodate the plurality of battery cells and formed to have at least one open side; and a pair of buffering members located between one side of a battery cell located at an outermost side in the first direction among the plurality of battery cells and a side of the module cover so that at least a part thereof is in contact with the sides of the battery cells and the module cover, respectively, wherein the buffering member is a leaf spring having at least one bent portion.

According to an embodiment, a plurality of guide grooves may be formed at a lower plate of the module cover so that the module cover and the battery cells are coupled thereto in a sliding manner.

According to an embodiment, a pair of coupling grooves may be formed at the lower plate of the module cover so that the module cover and the buffering member are coupled thereto in a sliding manner.

According to an embodiment, the buffering member may include: a body provided in contact with the battery cell located at the outermost side among the battery cells; a first bent portion connected to one end of the body and having a bent shape, the first bent portion being at least partially in contact with the side of the module cover; and a second bent portion connected to the other end of the body and having a bent shape, the second bent portion being at least partially in contact with the side of the module cover and being spaced apart from the first bent portion.

According to an embodiment, the first bent portion and the second bent portion may be bent to protrude toward the module cover.

According to an embodiment, the first bent portion and the second bent portion may be respectively connected to both sides of the body and located to overlap edges of both sides of the body.

According to an embodiment, the first bent portion and the second bent portion may be respectively connected at upper and lower ends of the body and located to overlap upper and lower regions of the body.

According to an embodiment, ends of the first bent portion and the second bent portion may be spaced apart from the body.

According to an embodiment, the buffering member may have a plurality of bent portions, and the bent portions are bent to protrude toward the module cover.

According to an embodiment, the plurality of bent portions may be formed at upper and lower regions of the buffering member.

According to an embodiment, the plurality of bent portions may be formed at a central region of the buffering member.

According to an embodiment, the buffering member may have an area equal to or greater than an area of a side of the battery cell at which the buffering member is disposed.

According to an embodiment, the guide grooves and the coupling grooves may be formed along a second direction which is perpendicular to the first direction, when being observed from the above.

According to an embodiment, a sealing portion of the battery cell may be inserted into the guide groove.

The present disclosure may provide a battery pack, comprising the battery module described above.

The present disclosure may provide a vehicle, comprising the battery pack described above.

Advantageous Effects

According to an embodiment of the present disclosure, a buffering member may be provided between an outermost cell of battery cells and a module cover to protect the battery module from external impact or swelling of the battery cells.

In addition, according to an embodiment of the present disclosure, the buffering member may be provided only at an outermost cell of the battery cells energy to maximize the volume occupied by the battery cells within the battery module, thereby improving an energy density of the battery cells.

Moreover, according to an embodiment of the present disclosure, the battery cells and the buffering member may be coupled to the grooves formed at the module cover in a sliding manner, thereby simplifying the manufacturing process of the battery module.

The effects of the present disclosure are not limited to the above, and effects not mentioned herein may be clearly understood by those skilled in the art from the specification and the accompanying drawings.

BEST MODE

Hereinafter, embodiments of the present disclosure will be described in more detail with reference to the accompanying drawings. The embodiments of the present disclosure may be modified in various ways, and the scope of the present disclosure should not be construed as being limited to the embodiments described below. The embodiments are provided to more fully illustrate the present disclosure to those skilled in the art. Thus, the shapes of the components in the figures may be exaggerated to emphasize a clearer description. In addition, terms and words used in the specification and the claims should not be construed as being limited to ordinary or dictionary meanings, but interpreted based on the meanings and concepts corresponding to technical aspects of the present disclosure on the basis of the principle that the inventor is allowed to define terms appropriately for the best explanation.

Figure 1:
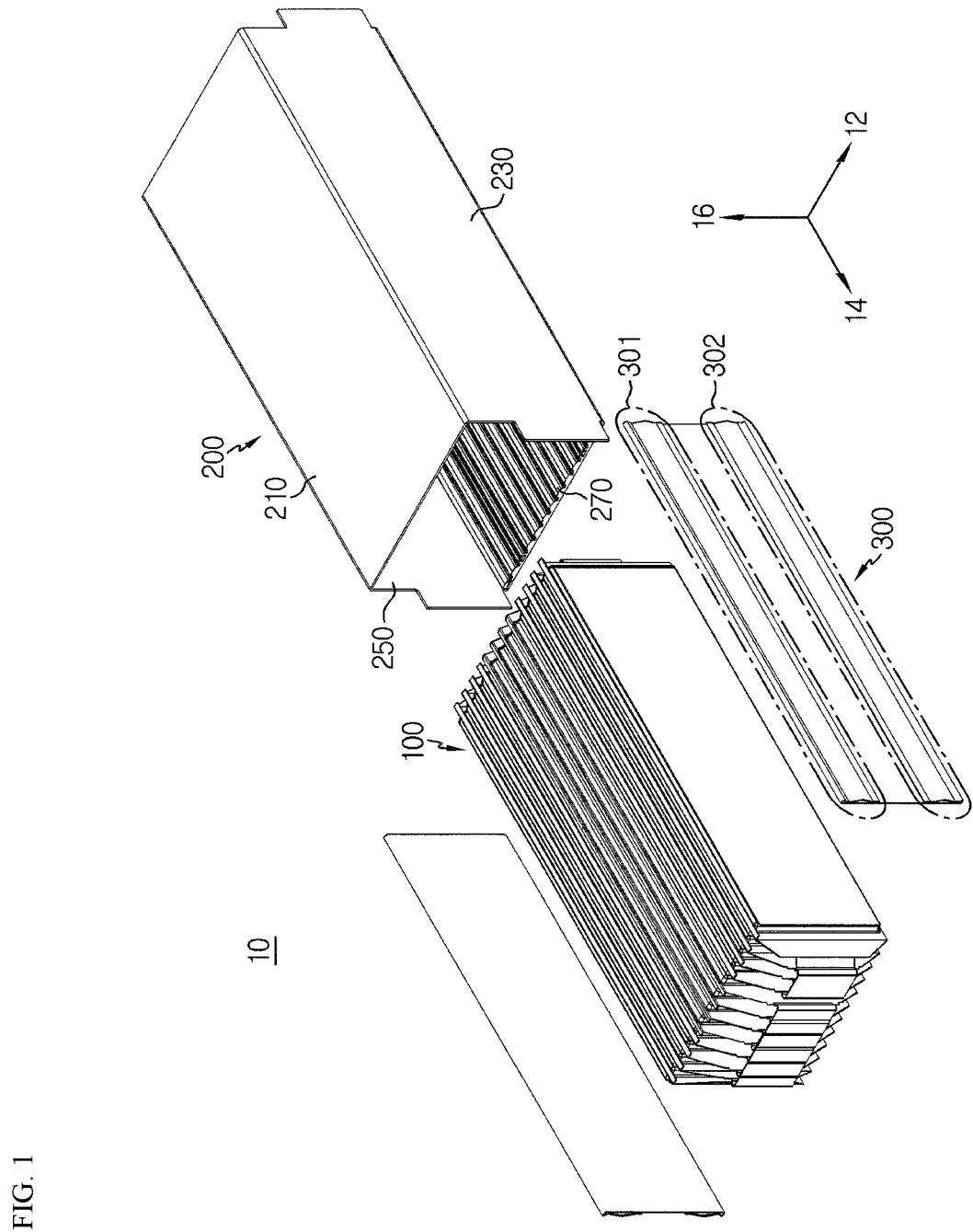
FIG. 1 is an exploded perspective view showing a battery module according to an embodiment of the present disclosure.
Figure 2:
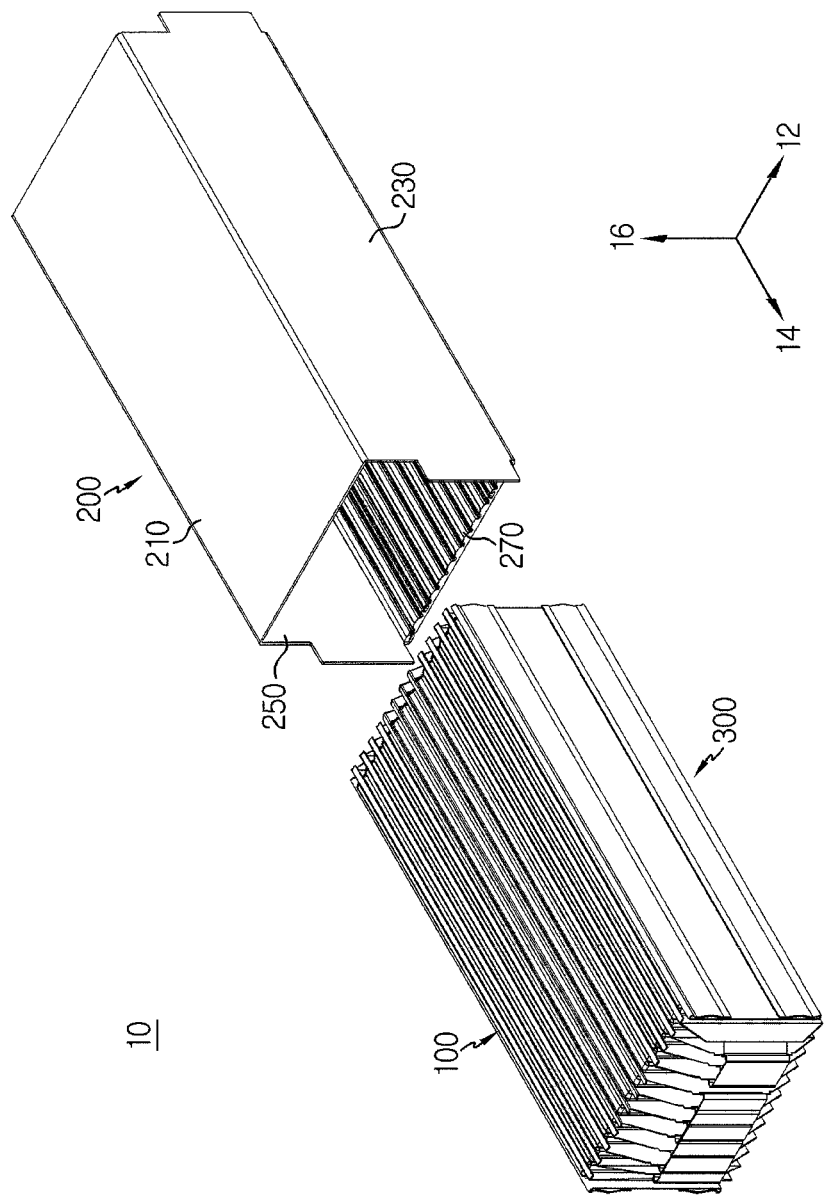
FIG. 2 is an exploded perspective view showing that a buffering member depicted in FIG. 1 is coupled to a battery cell.
Figure 3:
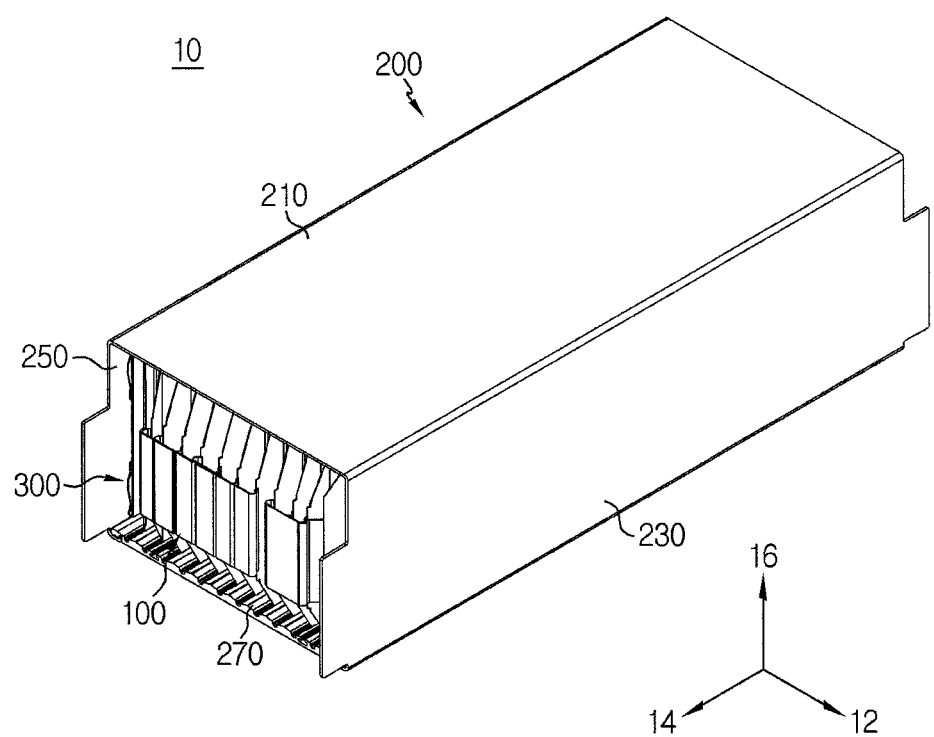
FIG. 3 is a perspective view showing the battery module of FIG. 1 in an assembled state.

FIG. 1 is an exploded perspective view showing a battery module according to an embodiment of the present disclosure, FIG. 2 is an exploded perspective view showing that a buffering member depicted in FIG. 1 is coupled to a battery cell, and FIG. 3 is a perspective view showing the battery module of FIG. 1 in an assembled state.

Referring to FIGS. 1 to 3, a battery module 10 has a plurality of battery cells 100. The battery cell 100 may be provided as a secondary battery. For example, the battery cell 100 may be provided as a pouch-type secondary battery. Hereinafter, the battery cell 100 of the present disclosure is provided as a pouch-type secondary battery as an example.

The battery module 10 includes a battery cell 100, a module cover 200 and a buffering member 300.

A plurality of battery cells 100 may be provided. The plurality of battery cells 100 may be located to face each other. The plurality of battery cells 100 may be arranged side by side so that their respective faces face each other. Hereinafter, a direction in which the plurality of battery cells 100 are arranged side by side is referred to as a first direction 12. When being observed from the above, a direction perpendicular to the first direction 12 is referred to as a second direction 14. A direction perpendicular to both the first direction 12 and the second direction 14 is referred to as a third direction 16.

Figure 4:
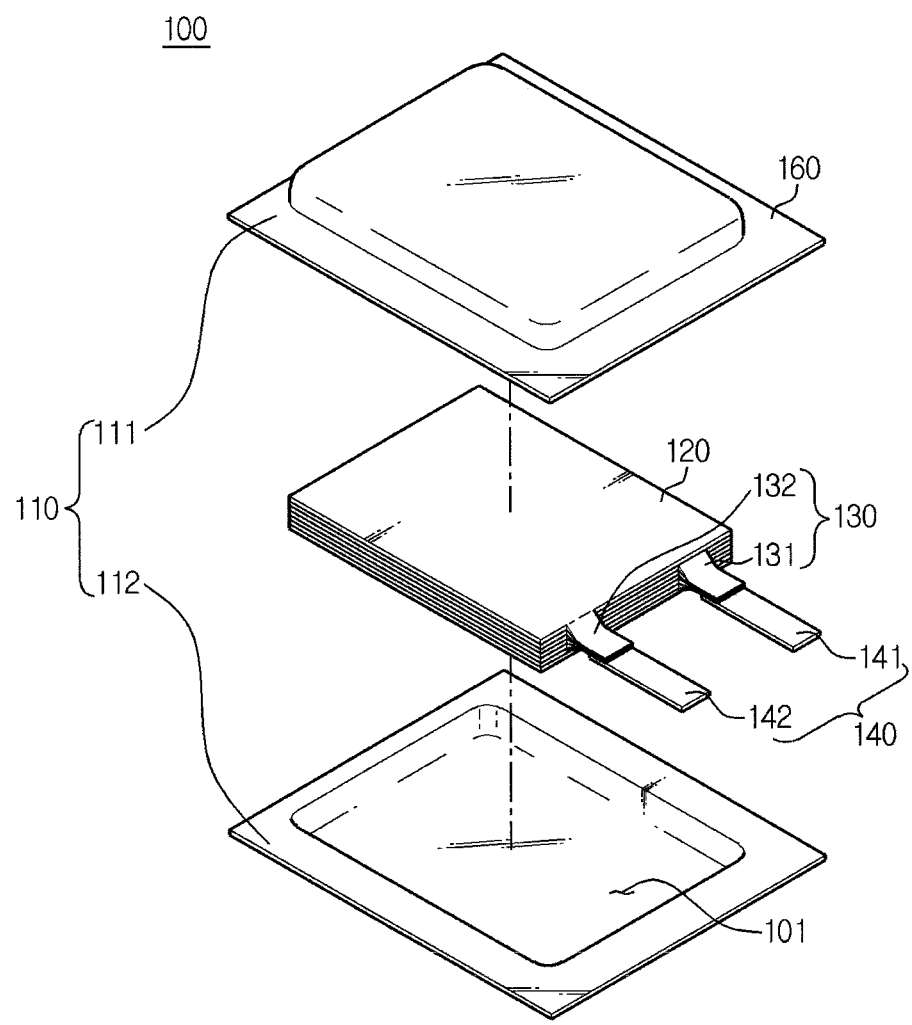
FIG. 4 is an exploded perspective view showing the battery cell of FIG. 1.
Figure 5:
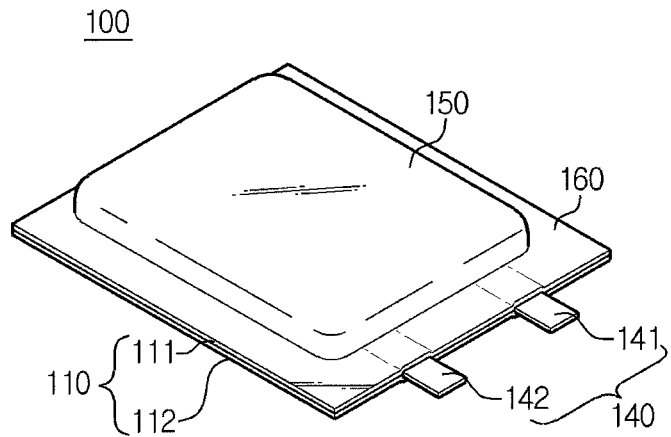
FIG. 5 is a perspective view showing the battery cell of FIG. 1 in an assembled state.

FIG. 4 is an exploded perspective view showing the battery cell of FIG. 1, and FIG. 5 is a perspective view showing the battery cell of FIG. 1 in an assembled state.

Referring to FIGS. 4 and 5, the battery cell 100 includes a pouch case 110, an electrode assembly 120, an electrode tab 130 and an electrode lead 140.

The pouch case 110 has an inner space 101. Inside the pouch case 110, an electrode assembly 120 and an electrolyte, explained later, are positioned. A central region of the pouch case 110 is provided to protrude upward and downward. The pouch case 110 includes an upper case 111 and a lower case 112.

The upper case 111 and the lower case 112 are combined with each other to form the inner space 101. A central region of the upper case 111 has a concave shape protruding upward. The lower case 112 is located under the upper case 111. A central region of the lower case 112 has a concave shape protruding downward. Alternatively, the inner space 101 of the pouch case 110 may be formed in only any one of the upper case 111 and the lower case 112.

The upper case 111 and the lower case 112 respectively have a sealing portion 160. The sealing portion 160 of the upper case 111 and the sealing portion 160 of the lower case 112 may be provided to face each other. The sealing portion 160 of the upper case 111 and the sealing portion 160 of the lower case 112 may be bonded to each other by thermal bonding or the like. The inner space 101 may be sealed by bonding the sealing portions 160.

An electrolyte and an electrode assembly 120 are accommodated in the inner space 101 of the pouch case 110. The pouch case 110 may have an outer insulating layer, a metal layer, and an inner adhesive layer. The outer insulating layer may prevent exterior moisture, gas or the like from penetrating therein. The metal layer may improve the mechanical strength of the pouch case 110. The metal layer may be made of aluminum. Alternatively, the metal layer may be made of any one selected from an alloy of iron, carbon, chromium and manganese, an alloy of iron and nickel, aluminum or equivalents thereof. When the metal layer uses a material containing iron, mechanical strength may be enhanced. When the metal layer is made of aluminum, good ductility may be ensured. Aluminum is a desired material of the metal layer. The outer insulating layer and the inner adhesive layer may be made of a polymer material.

The electrode assembly 120 includes a positive electrode plate, a negative electrode plate, and a separator. The electrode assembly 120 may be configured so that at least one positive electrode plate and at least one negative electrode plate are disposed with a separator being interposed therebetween. The electrode assembly 120 may be configured so that a plurality of positive electrode plates and a plurality of negative electrode plates are alternately stacked. Alternatively, the electrode assembly 120 may also be configured so that one positive electrode plate and one negative electrode plate are wound.

The electrode plate of the electrode assembly 120 includes a current collector and active material slurry coated on one or both sides of the current collector. The active material slurry may be formed by stirring a solvent in a state where a granular active material, an auxiliary conductor, a binder, and a plasticizer are added thereto. Each electrode plate may have an uncoated portion corresponding to a region where the active material slurry is not coated. In the uncoated portion, an electrode tab 130 corresponding to each electrode plate may be formed.

The electrode tab 130 is extended to protrude from the electrode assembly 120. The electrode tab 130 includes a positive electrode tab 131 and a negative electrode tab 132. The positive electrode tab 131 may extend from the uncoated portion of the positive electrode plate, and the negative electrode tab 132 may extend from the uncoated portion of the negative electrode plate.

One positive electrode tab 131 and one negative electrode tab 132 may be provided in the battery cell 100, respectively. Alternatively, a plurality of positive electrode tabs 131 and a plurality of negative electrode tabs 132 may also be provided. For example, if one positive electrode plate and one negative electrode plate are included in the electrode assembly 120 of the battery cell 100, one positive electrode tab 131 and one negative electrode tab 132 may be included. Alternatively, a plurality of positive electrode tabs 131 and a plurality of negative electrode tabs 132 may be included, respectively. If a plurality of positive electrode plates and a plurality of negative electrode plates are included in the electrode assembly 120, a plurality of positive electrode tabs 131 and a plurality of negative electrode tabs 132 may be included, and one electrode tab 130 may be provided to one electrode plate.

The electrode lead 140 may electrically connect the battery cell 100 to other external devices. The electrode lead 140 may include a positive electrode lead 141 and a negative electrode lead 142. The electrode lead 140 may be provided to extend from the inside to the outside of the pouch case 110. A portion of the electrode lead 140 may be interposed between the sealing portions 160. The electrode lead 140 is connected to the electrode tab 130. The electrode lead 140 of the present disclosure may be provided with the positive electrode lead 141 and the negative electrode lead 142 at one side of the pouch case 110. Alternatively, the positive electrode lead 141 may be provided at one side of the pouch case 110, and the negative electrode lead 142 may be provided on the other side thereof.

The battery cell 100 has an accommodation portion 150 and a sealing portion 160. Here, the accommodation portion 150 is a portion where the electrode assembly 120 is accommodated in the battery cell 100. The sealing portion 160 is sealing portions at four sides of the pouch case 110 surrounding the accommodation portion 150.

Figure 6:
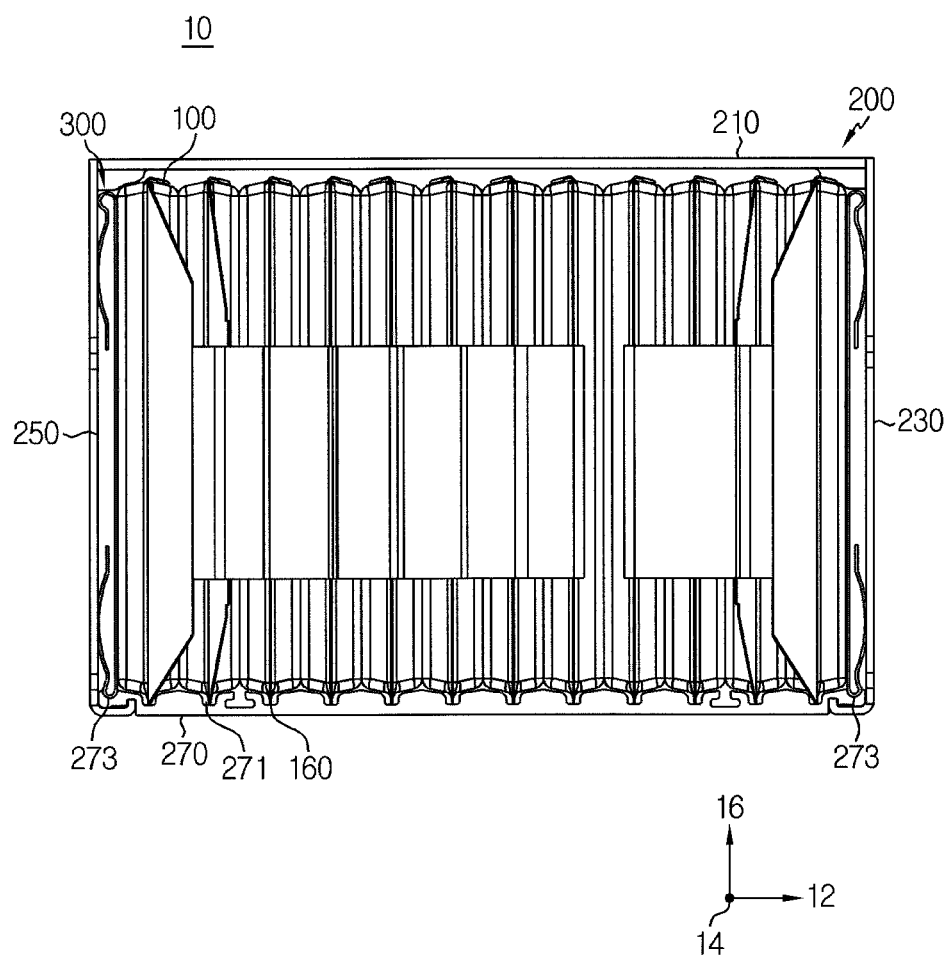
FIG. 6 is a front view showing the battery module of FIG. 1.

FIG. 6 is a front view showing the battery module of FIG. 1. Here, referring to FIGS. 1 to 3 and 6, the module cover 200 may protect the battery cells 100. The module cover 200 has an empty space inside. The inner space of the module cover 200 accommodates a plurality of battery cells 100. The module cover 200 may be provided to have at least one open side. The module cover 200 may be provided in a rectangular parallelepiped shape as a whole. For example, among the sides of the module cover 200, sides facing each other along the second direction 14 may be opened.

The module cover 200 includes an upper plate 210, sides 230, 250, and a lower plate 270. The upper plate 210 may be provided in a rectangular shape, when being observed from the third direction 16.

A pair of sides 230, 250 may be coupled to the upper plate 210. The pair of sides 230, 250 may be spaced from each other along first direction 12. The pair of sides 230, 250 may face each other along first direction 12 and have the same shape and size.

The lower plate 270 is located below the upper plate 210 in the third direction 16. The lower plate 270 may be provided in substantially the same shape as the upper plate 210. The lower plate 270 may be provided with an area larger than the upper plate 210.

The lower plate 270 is provided with an area larger than that of the upper plate 210 so that a component such as a sensing member may be coupled to the battery module 10 thereafter inside the space between the lower plate 270 and the upper plate 210. In addition, the battery cells 100 coupled to the lower plate 270 may be stably supported.

The lower plate 270 may have a guide groove 271 and a coupling groove 273 formed therein.

The battery cell 100 may be inserted into the guide groove 271. The guide groove 271 may have a downwardly concave shape in the third direction 16. The guide groove 271 may be shaped so that its width in the first direction 12 decreases downwards along the third direction 16. The guide groove 271 and the battery cell 100 may be coupled in a sliding manner. In other words, a part of the battery cell 100 may be inserted and coupled into the guide groove 271. For example, the sealing portion 160 of the battery cell 100 may be inserted into the guide groove 271. A plurality of guide grooves 271 may be provided. The guide grooves 271 may be provided in a number corresponding to the battery cells 100. The guide groove 271 may be formed so that its longitudinal side extends in the second direction 14. The plurality of guide grooves 271 may be spaced by a predetermined distance along the first direction 12.

As described above, the plurality of battery cells 100 may be coupled in a sliding manner through the guide groove 271 formed at the lower plate 270. The guide groove 271 may simplify the assembling process when the battery module 10 is manufactured, thereby shortening the time required for the manufacturing process. Also, since the sealing portion 160 of the battery cell 100 may be inserted into the guide groove 271, the battery cell 100 may be stably supported.

Figure 7:
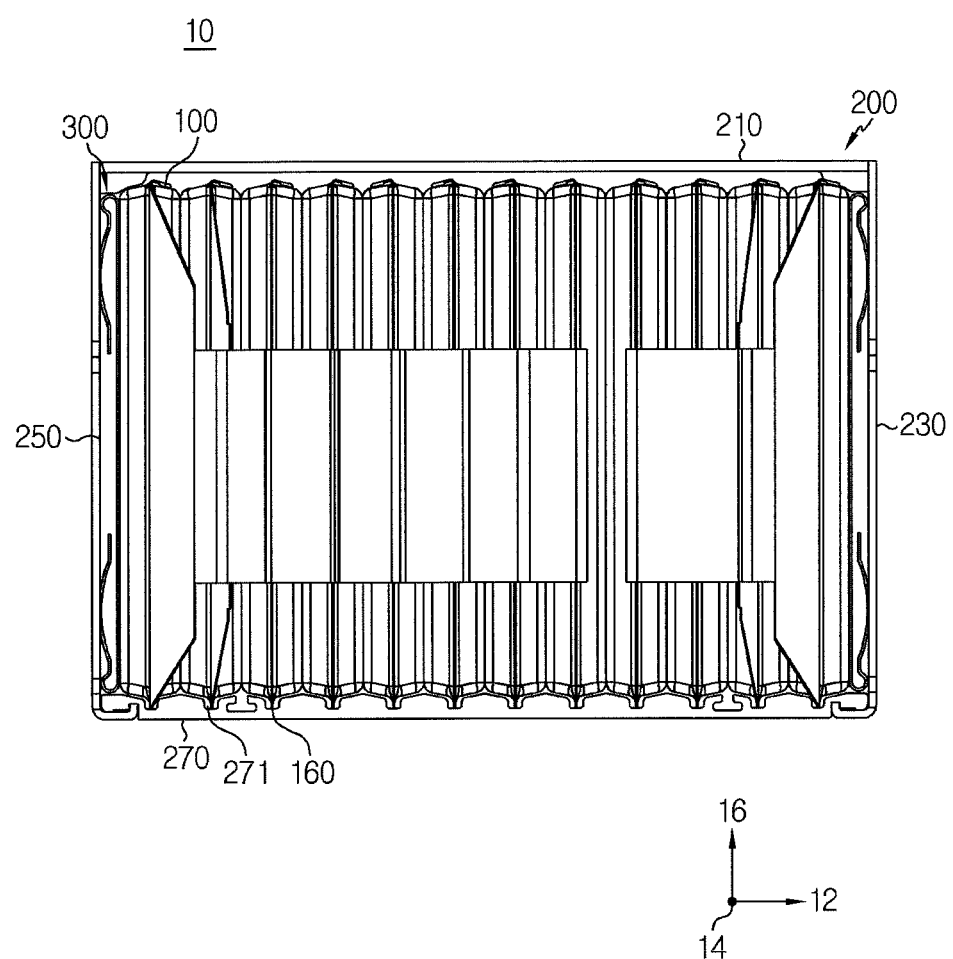
FIG. 7 is a front view showing another embodiment of the battery cell of FIG. 1.

The buffering member 300 may be inserted into the coupling groove 273. The coupling groove 273 may have a downwardly concave shape in the third direction 16. The coupling groove 273 may be shaped so that its width in the first direction 12 decreases downwards along the third direction 16. The coupling groove 273 and the buffering member 300 may be coupled in a sliding manner. In other words, a part of the buffering member 300 may be inserted and coupled into the coupling groove 273. For example, a second bent portion 350 of the buffering member 300, explained later, may be inserted into the coupling groove 273. The coupling groove 273 may be provided as a pair. A pair of coupling grooves 273 may be spaced along the first direction 12. The plurality of guide grooves 271 may be positioned between the pair of coupling grooves 273. The pair of coupling grooves 273 may be spaced from the guide grooves 271 along the first direction 12. The coupling groove 273 may be formed so that its longitudinal side extends in the second direction 14. In the above example, it has been explained that a pair of coupling grooves 273 are provided at the lower plate 270. However, the coupling groove 273 may also not be provided as shown in FIG. 7.

As described above, the pair of buffering members 300 may be coupled in a sliding manner through the coupling groove 273 formed at the lower plate 270. The coupling groove 273 may simplify the assembling process when the battery module 10 is manufactured, thereby shortening the time required for the manufacturing process. In addition, since a portion of the buffering member 300 is inserted into the coupling groove 2730, the buffering member 300 may be stably supported.

Figure 8:
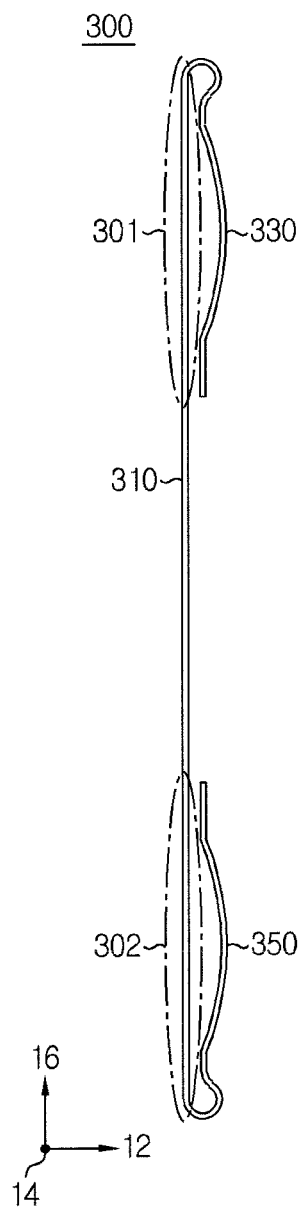
FIG. 8 is a front view showing the buffering member of FIG. 1.

FIG. 8 is a front view showing the buffering member of FIG. 1. Here, referring to FIGS. 1 to 3, 6 and 8, the buffering member 300 may support the battery cell 100 during swelling of the battery cell 100 and buffer a shock applied thereto. Also, the buffering member 300 may protect the battery cell 100 from an external impact. The buffering member 300 may be positioned between one side of a battery cell 100 located at an outermost side among the battery cells 100 and the sides 230, 250 of the module cover 200. The buffering member 300 may be provided as a pair. A pair of buffering members 300 may be spaced apart from each other by a predetermined distance along the first direction 12. The buffering member 300 may be provided as a leaf spring having at least one bent portion. Alternatively, the buffering member 300 may be made of a material with elasticity.

The buffering member 300 may include a body 310, a first bent portion 330 and a second bent portion 350.

The body 310 may be in contact with the battery cell 100 located at the outermost side among the battery cells 100. The area of the body 310 may be equal to or larger than the area of the battery cell 100 in contact with the body 310. Since the area of the body 310 is equal to or larger than the area of the battery cell 100 in contact with the body 310, the body 310 may support the entire surface of the battery cell 100 during swelling of the battery cell 100. The body 310 may have a rectangular shape when being observed in the first direction 12.

The first bent portion 330 may be connected to one end of the body 310. The first bent portion 330 may be bent to protrude toward the module cover 200. For example, the bending direction of the first bent portion 330 may be formed as the first direction 12 toward the module cover 200. As an example, the first bent portion 330 may be connected to an upper end of the body 310. An end of the first bent portion 330 may be spaced apart from the body 310 by a predetermined distance.

In detail, a lower end of the first bent portion 330 in the third direction 16 may be spaced apart from the body 310 by a predetermined distance. When the battery cell 100 rises during swelling of the battery cell 100, the body 310 may also be extended toward the module cover 200 due to the battery cell 100. At this time, the end of the first bent portion 330 is normally spaced apart from the body 310, but when the body 310 is extended, the body 310 may come into contact with the body 310 and support the body 310 to absorb the impact upon swelling. In addition, even when an external impact is applied, the end of the first bent portion 330 may come into contact with the body 310 to absorb the external impact, thereby protecting the battery cell 100.

The first bent portion 330 may be in contact with the sides 230, 250 of the module cover 200. When the buffering member 300 is observed in the first direction 12, a region in which the first bent portion 330 is formed may overlap an upper region 301 of the body 310. Here, the upper region 301 of the body 310 refers to an upper region 301 in the third direction 16 when the body 310 is observed in the first direction 12, as shown in FIGS. 1 and 8. A lower region 302 refers to a lower region 302 in the third direction 16 when the body 310 is observed in the first direction 12, as shown in FIGS. 1 and 8.

The second bent portion 350 may be connected to the other end of the body 310. The second bent portion 350 may be bent to protrude toward the module cover 200. For example, the bending direction of the second bent portion 350 may be formed as the first direction 12 toward the module cover 200. For example, the second bent portion 350 may be connected to a lower end of the body 310. The second bent portion 350 may be located at a lower portion of the first bent portion 330 in the third direction 16. An end of the second bent portion 350 may be spaced apart from the body 310 by a predetermined distance.

In detail, an upper end of the second bent portion 350 in the third direction 16 may be spaced apart from the body 310 by a predetermined distance. When the battery cell 100 rises during swelling of the battery cell 100, the body 310 may also be extended toward the module cover 200 due to the battery cell 100. At this time, the end of the second bent portion 350 is normally spaced apart from the body 310, but when the body 310 is extended, the body 310 may come into contact with the body 310 and support the body 310 to absorb the impact upon swelling. In addition, when an external impact is applied, the end of the second bent portion 350 may come into contact with the body 310 to absorb the external impact, thereby protecting the battery cell 100.

The lower end of the second bent portion 350 in the third direction 16 may be inserted into the coupling groove 273. The second bent portion 350 may be coupled to the coupling groove 273 in a sliding manner, thereby simplifying the assembling process of the buffering member 300 and increasing the bonding force. On the contrary, if the coupling groove 273 is not provided at the lower plate 270 as shown in FIG. 7, the buffering member 300 may be inserted into a space between the battery cells 100 and the sides 230, 250 of the module cover 200. In this case, the buffering member 300 may be held between one side of the battery cells 100 and the sides 230, 250 of the module cover 200 by means of an elastic force.

The size of the second bent portion 350 may be generally the same as the size of the first bent portion 330. The second bent portion 350 may be in contact with the sides 230, 250 of the module cover 200. When the buffering member 300 is observed in the first direction 12, a region where the second bent portion 350 is formed may be located to overlap the lower region 302 of the body 310 as shown in FIGS. 1 and 8.

The body 310 of the buffering member 300 is in contact with one side of the battery cell 100, and the first bent portion 330 and the second bent portion 350 of the buffering member 300 are in contact with the sides 230, 250 of the module cover 200, so that the buffering member 300 absorbs an external shock. In addition, when the battery cell 100 swells, even though the volume of the battery cell 100 is expanded at both sides of the first direction 12, the buffering member 300 may be positioned between the module cover 200 and the battery cell 100 to absorb the shock caused by the swelling of the battery cell 100 and protect the battery cell 100. In addition, the buffering member 300 may stably support and protect the battery cell 100 during swelling of the battery cell 100 by providing the first bent portion 330 and the second bent portion 350 to solve a problem that a central portion of the battery cell 100 rises further during swelling of the battery cell 100 to concentrate the force at both edge regions of the buffering member 300.

Figure 9:
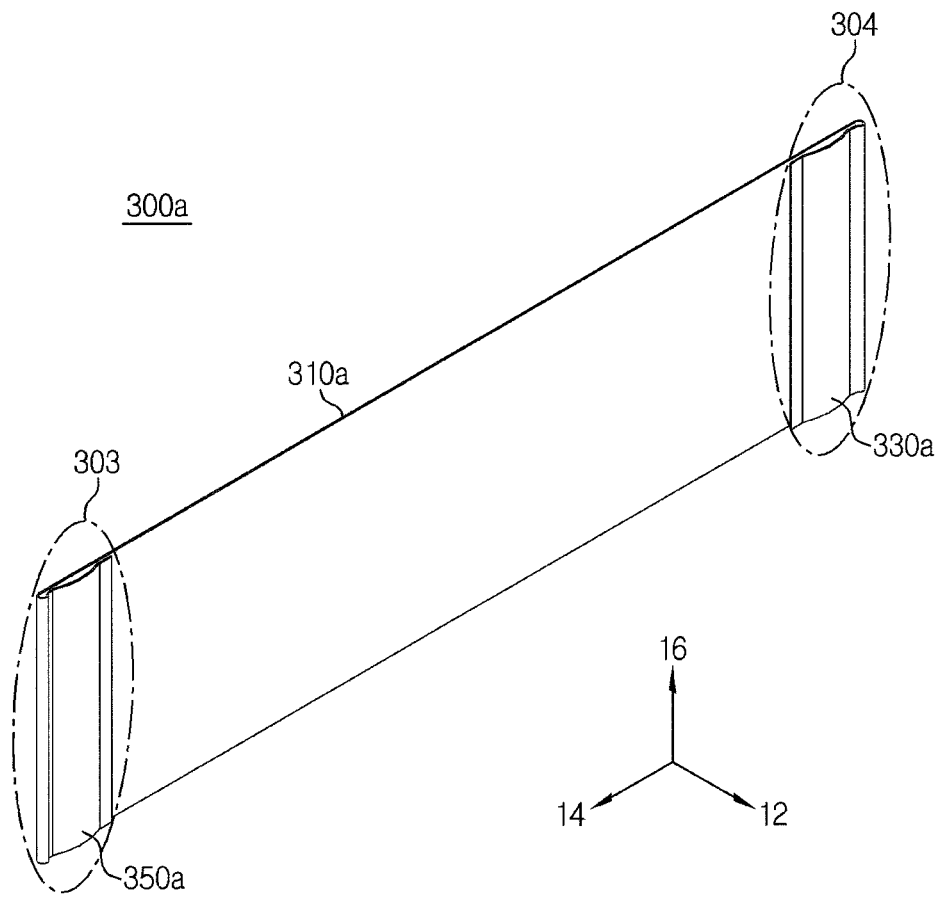
FIG. 9 is a perspective view showing another embodiment of the buffering member of FIG. 8.
Figure 10:
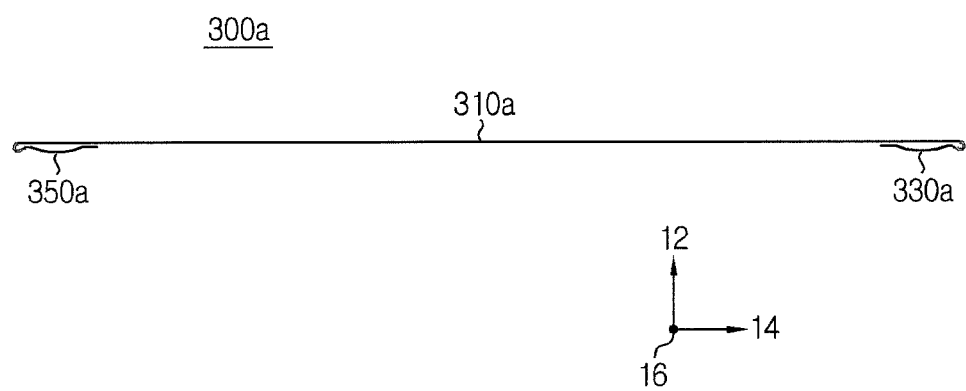
FIG. 10 is a plane view showing the buffering member of FIG. 9.

FIG. 9 is a perspective view showing another embodiment of the buffering member of FIG. 8, and FIG. 10 is a plane view showing the buffering member of FIG. 9. Here, referring to FIGS. 9 and 10, the buffering member 300a includes a body 310a, a first bent portion 330a and a second bent portion 350a.

The body 310a of the buffering member 300a is substantially identical to the body 310 of the buffering member 300 of FIG. 8.

The first bent portion 330a and the second bent portion 350a may be coupled to both sides 230, 250 of the body 310a in the second direction 14. The first bent portion 330a and the second bent portion 350a may be bent toward the module cover 200, respectively. The first bent portion 330a and the second bent portion 350a may be spaced apart from each other along the second direction 14 by a predetermined distance. When being observed in the first direction 12, the first bent portion 330a and the second bent portion 350a may be located to overlap edge regions 303, 304 at both sides 230, 250 of the body 310a in the second direction 14.

Though not shown in the figures, different from the above embodiments, the buffering member 300 may also be provided to have bent portions at all of both sides 230, 250 and the upper and lower ends of the body 310.

In the above embodiment, when the battery cell 100 swells, the center of the battery cell 100 swells more greatly, and the force may also be concentrated at the central portion of the buffering member 300. In this case, the center of the buffering member 300 may be more expanded outwardly, and thus the force may be concentrated at the edge regions of the buffering member 300. Therefore, in an embodiment of the present disclosure, the elasticity is reinforced at the edge regions of the buffering member 300 by means of the first bent portion 330 and the second bent portion 350, so that the battery cell 100 may be stably supported. Further, the battery cell 100 may be stably protected from external impacts by means of the first bent portion 330 and the second bent portion 350.

Figure 11:
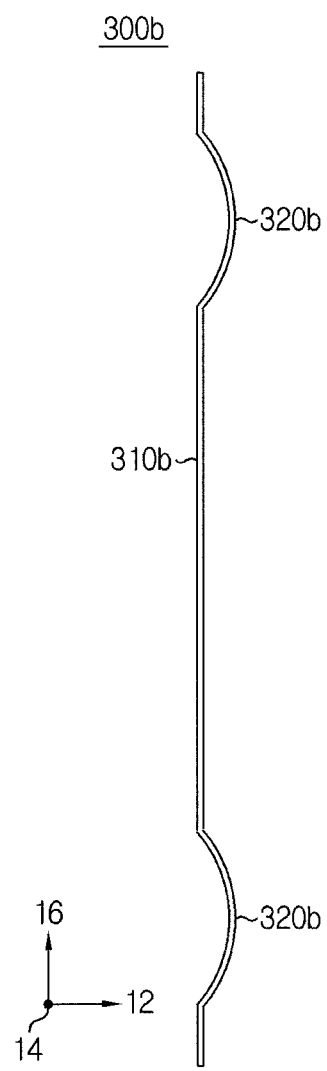
FIG. 11 is a front view showing another embodiment of the buffering member of FIG. 8.
Figure 12:
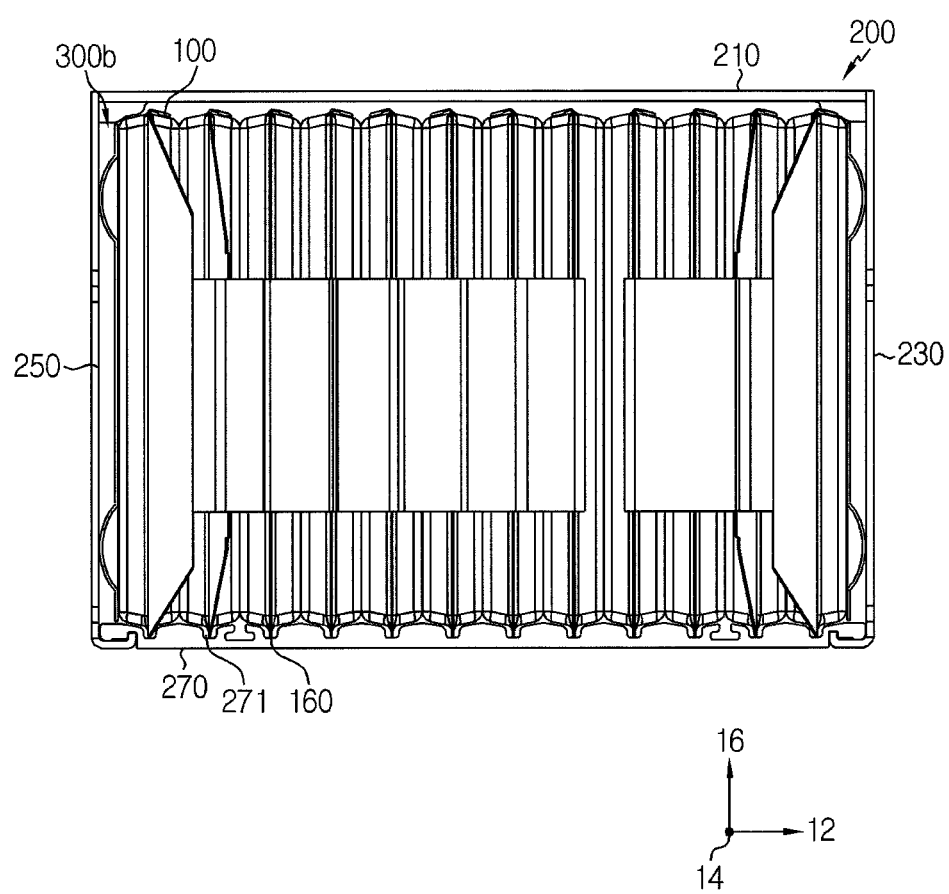
FIG. 12 is a front view showing a battery module to which the buffering member of FIG. 11 is coupled.

FIG. 11 is a front view showing another embodiment of the buffering member of FIG. 8, and FIG. 12 is a front view showing a battery module to which the buffering member of FIG. 11 is coupled.

Hereinafter, referring to FIGS. 11 and 12, the buffering member 300b includes a body 310b and a bent portion 320b.

The body 310 of FIG. 11 is generally identical to the body 310 of FIG. 8. However, different from FIG. 8, the body 310 of FIG. 11 has a shorter length in the third direction 16.

The bent portion 320b is formed in connection with the body 310. A plurality of bent portions 320b may be provided. For example, the bent portion 320b may be formed at upper and lower portions of the body 310 in the third direction 16, respectively. The bent portion 320b may be bent toward the module cover 200. The protruding portion of the bent portion 320b may be positioned in contact with the sides 230, 250 of the module cover 200. The bent portion 320b may be positioned in contact with edge regions of the sides 230, 250 of the module cover 200 in the third direction 16, respectively.

Figure 13:
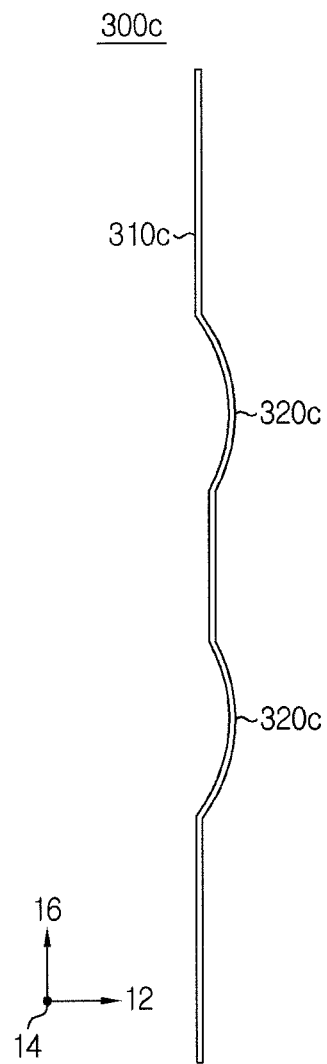
FIG. 13 is a front view showing another embodiment of the buffering member of FIG. 8.
Figure 14:
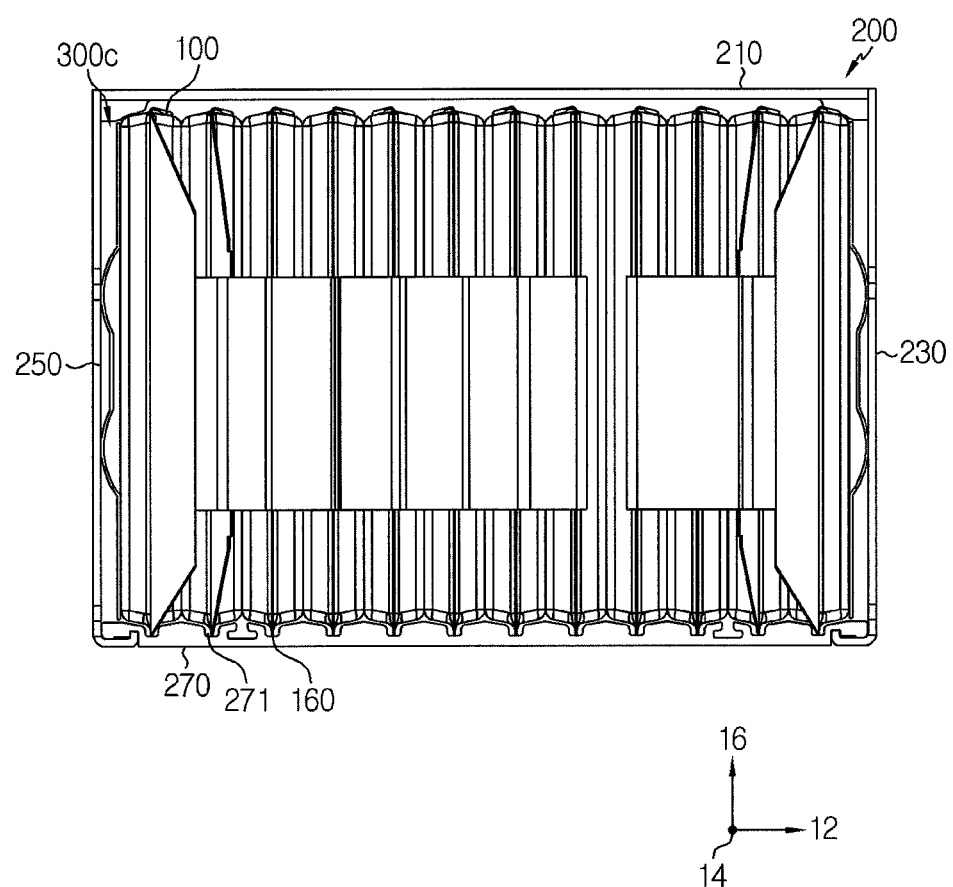
FIG. 14 is a front view showing that a buffering member to which the buffering member of FIG. 13 is coupled.

FIG. 13 is a front view showing another embodiment of the buffering member of FIG. 8, and FIG. 14 is a front view showing that a buffering member to which the buffering member of FIG. 13 is coupled.

Here, referring to FIGS. 13 and 14, the body 310c of FIG. 13 is generally identical to the body 310 of FIG. 8. However, different from FIG. 8, the body 310c of FIG. 13 has a shorter length in the third direction 16. In addition, the bent portion 320c, explained later, may be formed at the center of the buffering member 300c in the third direction 16, and the body 310c may be formed at the upper and lower portions of the body 310c in the third direction 16. The bent portion 320c may be positioned in contact with central regions of the sides 230, 250 of the module cover 200 in the third direction 16, respectively.

The bent portion 320c is formed in connection with the body 310c. A plurality of bent portions 320c may be provided. For example, the bent portion 320c may be formed at the center portion of the body 310c in the third direction 16. The bent portion 320c may be bent toward the module cover 200. The protruding portion of the bent portion 320c may be positioned in contact with the sides 230, 250 of the module cover 200.

Figure 15:
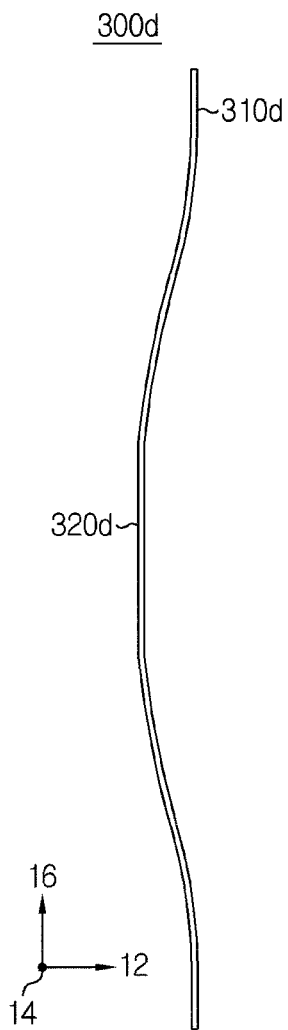
FIG. 15 is a front view showing another embodiment of the buffering member of FIG. 8.
Figure 16:
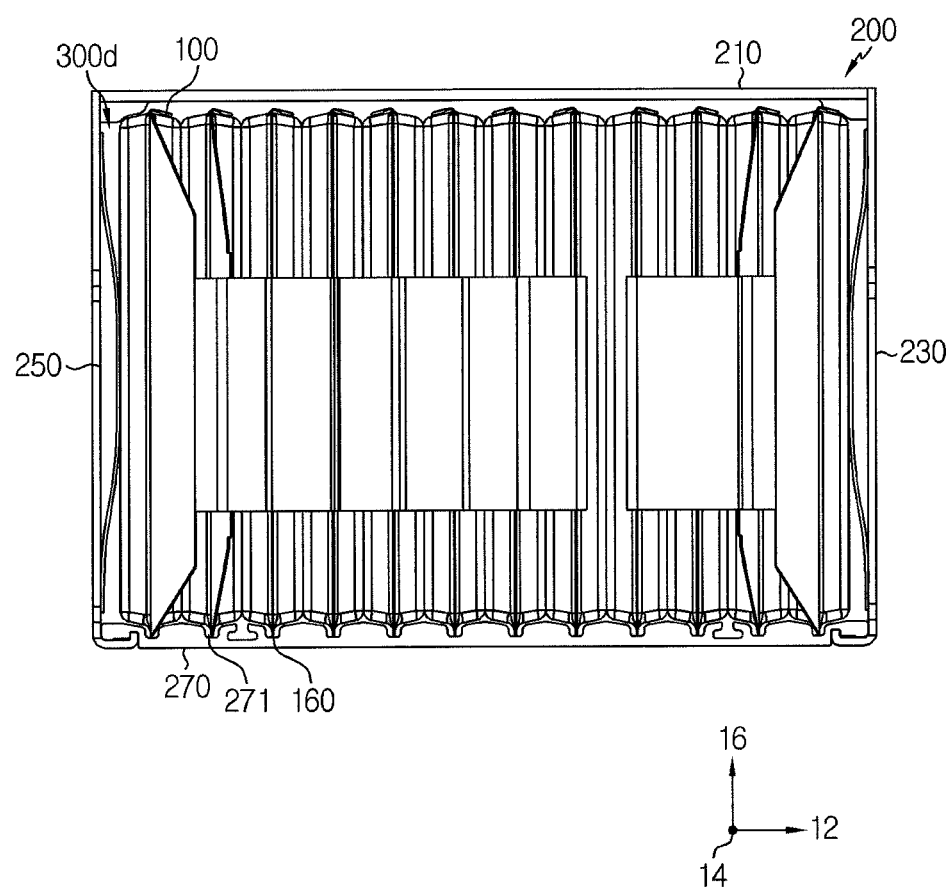
FIG. 16 is a front view showing that a buffering member to which the buffering member of FIG. 15 is coupled.

FIG. 15 is a front view showing another embodiment of the buffering member of FIG. 8, and FIG. 16 is a front view showing that a buffering member to which the buffering member of FIG. 15 is coupled.

The buffering member 300d of FIG. 15 may be provided to have a single bent portion 320d as a whole. The bent portion 320d may be protruded toward the module cover 200. The protruding portion of the bent portion 320d may be positioned in contact with the sides 230, 250 of the module cover 200.

The buffering member 300 of the present disclosure is not limited to the embodiments of the buffering member 300 described above but may be provided in various forms having a plurality of bent portions.

The battery pack according to the present disclosure may include at least one battery module 10 described above. In addition to the battery module 10, the battery pack may further include a case for accommodating the battery module 10, and various devices for controlling charge/discharge of the battery module 10. For example, a battery management system (BMS), a current sensor, a fuse, and the like may be further included.

The battery module 10 according to the present disclosure may be applied to vehicles such as electric vehicles and hybrid vehicles. The vehicle according to the present disclosure may include at least one battery pack including the battery module 10 according to the embodiment in the present disclosure.

As described above, in the present disclosure, since the buffering member 300 is provided, it is possible to support the battery cells 100 when the battery cell 100 swells during charging/discharging of the battery cell 100, and it is possible to protect the battery cells 100 by absorbing internal shocks. In addition, by providing the buffering member 300 between the battery cells 100 and the module cover 200, it is possible to protect the battery cells 100 from external impacts. In particular, the buffering member 300 may be provided in a shape having various bent portions to protect the battery module 10.

Moreover, according to an embodiment of the present disclosure, the compression pad provided between the battery cells 100 in the existing technique is removed, and thus the volume occupied by the battery cells 100 in the inner space of the battery module 10 may be maximized. By doing so, the volume occupied by the battery cells 100 in the battery module 10 may be increased, and the energy density of the battery module 10 may be improved.

The above description is illustrative of the present disclosure. Also, the above disclosure is intended to illustrate and explain the preferred embodiments of the present disclosure, and the present disclosure may be used in various other combinations, modifications, and environments. In other words, the present disclosure may be changed or modified within the scope of the concept of the invention disclosed herein, within the equivalent scope of the disclosure, and/or within the skill and knowledge of the art. The described embodiments illustrate the best state of the art to implement the technical idea of the present disclosure, and various changes may be made thereto as being demanded for specific applications and uses of the present disclosure. Accordingly, the above description is not intended to limit the present disclosure to the embodiments. Also, the appended claims should be construed as encompassing such other embodiments.

What is claimed is:

1. A battery module, comprising: a plurality of battery cells disposed to face each other and arranged side by side at least in a first direction;
    a module cover configured to accommodate the plurality of battery cells and formed to have a pair of sides spaced from each other in the first direction and at least one open side located between the pair of sides; and
    a pair of buffering members located between one side of a battery cell located at an outermost side in the first direction among the plurality of battery cells and a corresponding side of the module cover so that at least a part thereof is in contact with the sides of the battery cells and the module cover, respectively,
    wherein each buffering member is a leaf spring having at least one bent portion, and
    wherein a pair of coupling grooves are formed at a lower plate of the module cover so that the module cover and each buffering member are coupled thereto in a sliding manner.

2. The battery module according to claim 1,
    wherein a plurality of guide grooves are formed at the lower plate of the module cover so that the module cover and the battery cells are coupled thereto in a sliding manner.

3. The battery module according to claim 2, wherein each buffering member includes:
    a body provided in contact with the battery cell located at the outermost side among the battery cells;
    a first bent portion connected to one end of the body and having a bent shape, the first bent portion being at least partially in contact with the side of the module cover; and
    a second bent portion connected to the other end of the body and having a bent shape, the second bent portion being at least partially in contact with the side of the module cover and being spaced apart from the first bent portion.

4. The battery module according to claim 3,
    wherein the first bent portion and the second bent portion are bent to protrude toward the module cover.

5. The battery module according to claim 4,
    wherein the first bent portion and the second bent portion are respectively connected to both sides of the body and located to overlap edges of both sides of the body.

6. The battery module according to claim 4,
    wherein the first bent portion and the second bent portion are respectively connected at upper and lower ends of the body and located to overlap upper and lower regions of the body.

7. The battery module according to claim 4,
    wherein ends of the first bent portion and the second bent portion are spaced apart from the body.

8. The battery module according to claim 2,
    wherein each buffering member has a plurality of bent portions, and the bent portions are bent to protrude toward the module cover.

9. The battery module according to claim 8,
    wherein the plurality of bent portions are formed at upper and lower regions of each buffering member.

10. The battery module according to claim 8,
    wherein the plurality of bent portions are formed at a central region of each buffering member.

11. The battery module according to claim 2,
    wherein each buffering member has an area equal to or greater than an area of a side of the battery cell at which each buffering member is disposed.

12. The battery module according to claim 1,
    wherein the guide grooves and the coupling grooves are formed along a second direction which is perpendicular to the first direction, when being observed from the above.

13. A battery pack, comprising the battery module defined in claim 1.

14. A vehicle, comprising the battery pack defined in claim 13.

15. The battery module according to claim 1, wherein each battery cell includes:
    an electrode assembly;
    a battery case surrounding the electrode assembly; and
    an electrolyte in the battery case, and
    wherein the pair of buffering members located between the one side of the battery cell located at the outermost side in the first direction among the plurality of battery cells and the corresponding side of the module cover directly contact the sides of the battery cells and the module cover, respectively.

16. A battery module, comprising:

a plurality of battery cells disposed to face each other and arranged side by side at least in a first direction;

a module cover configured to accommodate the plurality of battery cells and formed to have at least one open side; and a pair of buffering members located between one side of a battery cell located at an outermost side in the first direction among the plurality of battery cells and a side of the module cover so that at least a part thereof is in contact with the sides of the battery cells and the module cover, respectively, wherein each buffering member is a leaf spring having at least one bent portion, and wherein each buffering member includes:
- a body provided in contact with the battery cell located at the outermost side among the battery cells;
  - a first bent portion connected to one end of the body and having a bent shape, the first bent portion being at least partially in contact with the side of the module cover; and
  - a second bent portion connected to the other end of the body and having a bent shape, the second bent portion being at least partially in contact with the side of the module cover and being spaced apart from the first bent portion, and wherein a pair of coupling grooves are formed at a lower plate of the module cover so that the module cover and each buffering member are coupled thereto in a sliding manner.

17. The battery module according to claim 1, wherein the pair of sides extend in a second direction perpendicular to the first direction such that the plurality of battery cells are insertable though the at least one end in the second direction, and wherein the pair of buffering members extend in the second direction.

18. The battery module of claim 16, wherein the pair of sides extend in a second direction perpendicular to the first direction such that the plurality of battery cells are insertable though the at least one end in the second direction, and wherein the pair of buffering members extend in the second direction.

19. The battery module according to claim 16, wherein each battery cell includes:
- an electrode assembly;
- a battery case surrounding the electrode assembly; and
- an electrolyte in the battery case, and wherein the pair of buffering members located between the one side of the battery cell located at the outermost side in the first direction among the plurality of battery cells and the corresponding side of the module cover directly contact the sides of the battery cells and the module cover, respectively.

* * * * *